United States Patent [19]

Hummel

[11] Patent Number: 5,412,649
[45] Date of Patent: May 2, 1995

[54] METHOD FOR MULTI-ADDRESS TRANSMISSION OF CELLS IN A COMMUNICATION NETWORK OPERATING IN THE ASYNCHRONOUS TRANSFER MODE

[75] Inventor: Heinrich Hummel, Bergkirchen, Germany

[73] Assignee: Siemens Aktiengesellschaft, Munich, Germany

[21] Appl. No.: 121,355

[22] Filed: Sep. 14, 1993

[30] Foreign Application Priority Data

Sep. 14, 1992 [DE] Germany ............ 42 30 744.9
Feb. 11, 1993 [DE] Germany ............ 43 04 120.5

[51] Int. Cl.⁶ ................................ H04Q 11/04
[52] U.S. Cl. ........................ 370/60.1; 370/94.1; 370/94.2; 370/54
[58] Field of Search .......... 370/60.1, 60, 94.1, 370/67, 85.13, 85.14, 94.2, 54, 92

[56] References Cited

U.S. PATENT DOCUMENTS

| 4,317,196 | 2/1982 | Ulug | 370/60 |
| 4,975,906 | 12/1990 | Takiyasu et al. | 370/85.13 |
| 5,060,228 | 10/1991 | Tsutsui et al. | 370/85.9 |
| 5,109,379 | 4/1992 | Kume et al. | 370/94.1 |

OTHER PUBLICATIONS

"ATM: Technologie für zukünftige Breitbandnetze", published by Siemens AG, order No. A30930-N15-50-P25-1-29, pp. 1-22.

Primary Examiner—Douglas W. Olms
Assistant Examiner—Shick Hom
Attorney, Agent, or Firm—Hill, Steadman & Simpson

[57] ABSTRACT

Method for multi-address transmission of cells in a communication network operating in-the asynchronous transfer mode. The method relates to a communication system (KA) of a communication network (KN) or to a switching structure (SN) of a communication system. Given multi-addressed cells to be transmitted by the communication network (KN) or the switching structure (SN), multi-addressing information (rsi) that is specifically associated to a switching stage or to a communication system is formed for every additional switching path in each of the communication systems (KA) or switching stages (ST). Further routing information (ri) attached thereto is formed and additionally inserted into a cell header (ZK) or into an internal cell header (IZK) of the communication system. The cells are transmitted multi-addressed in the communication network (KN) or the switching structure (SN) using this cell header (ZK) or internal cell header (IZK) of the communication system that precedes the respective cell. As a result of the method, the self-control principle of cells through a multi-stage communication network (KN) or an n-stage switching structure (SN) is preserved without any restrictions.

13 Claims, 4 Drawing Sheets

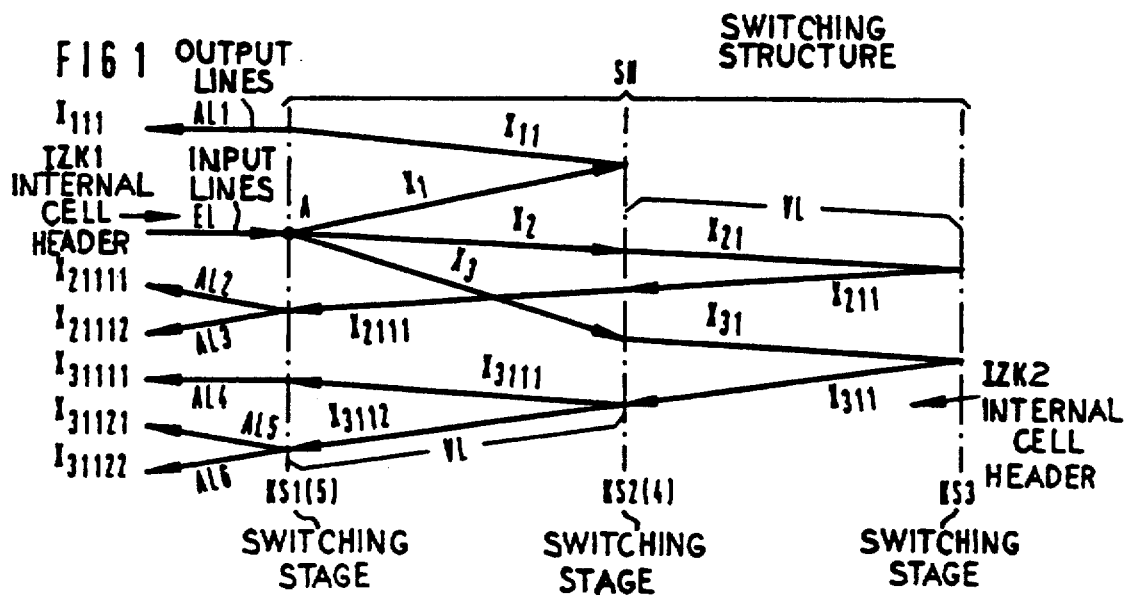

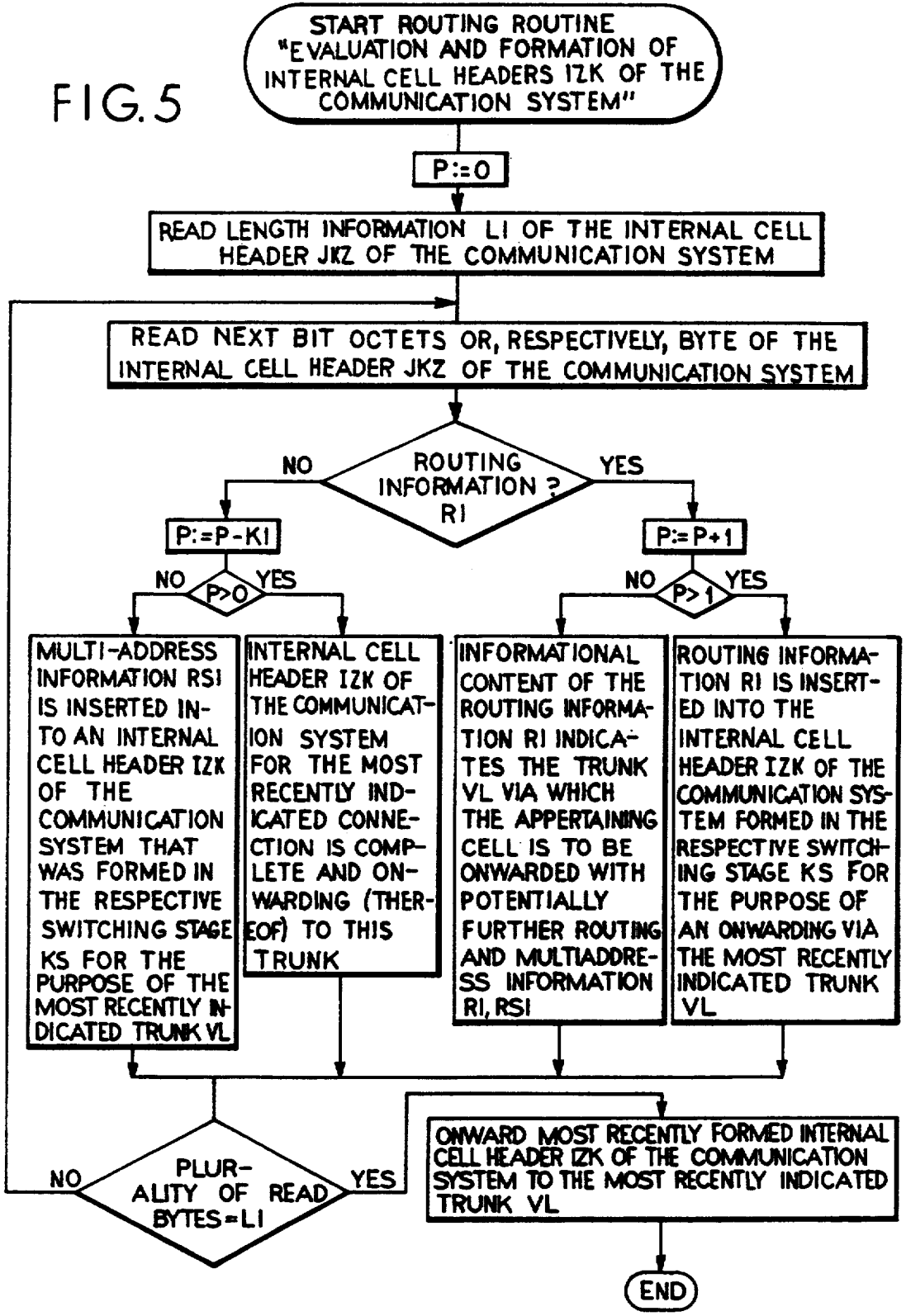

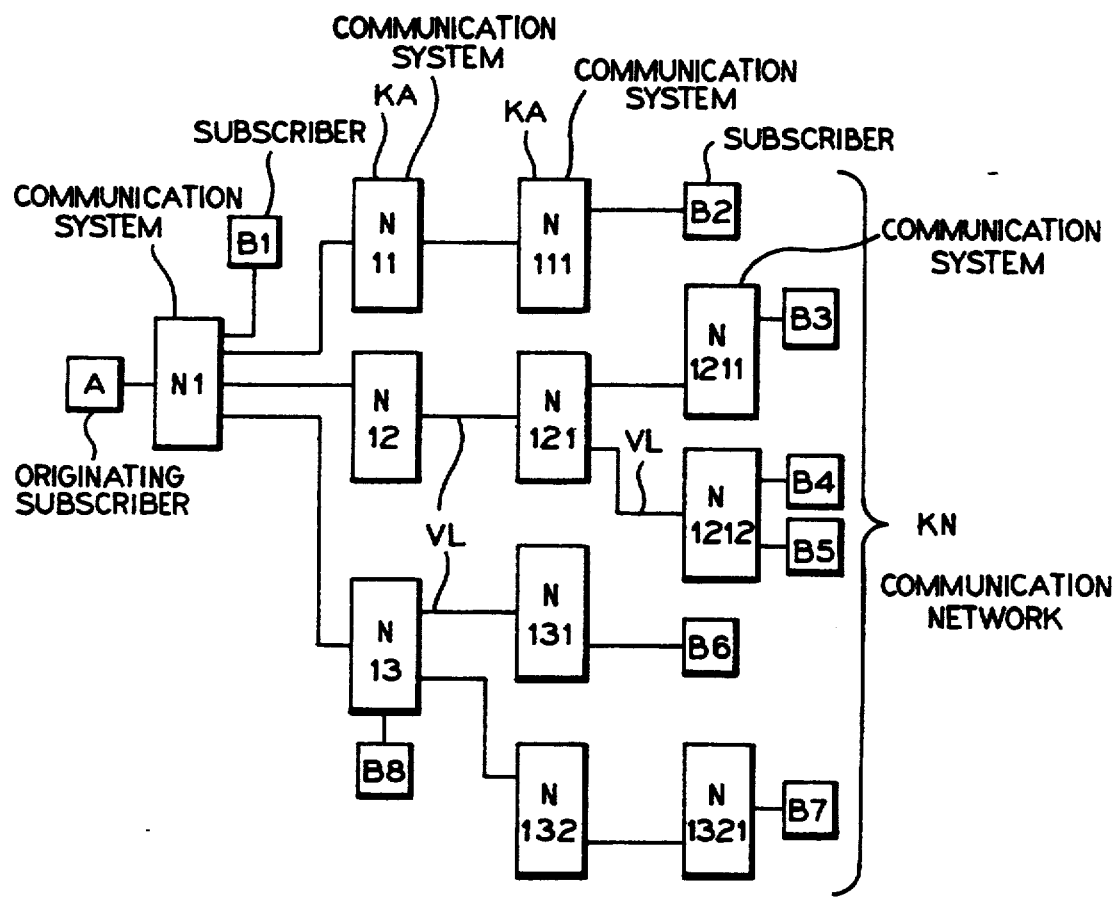

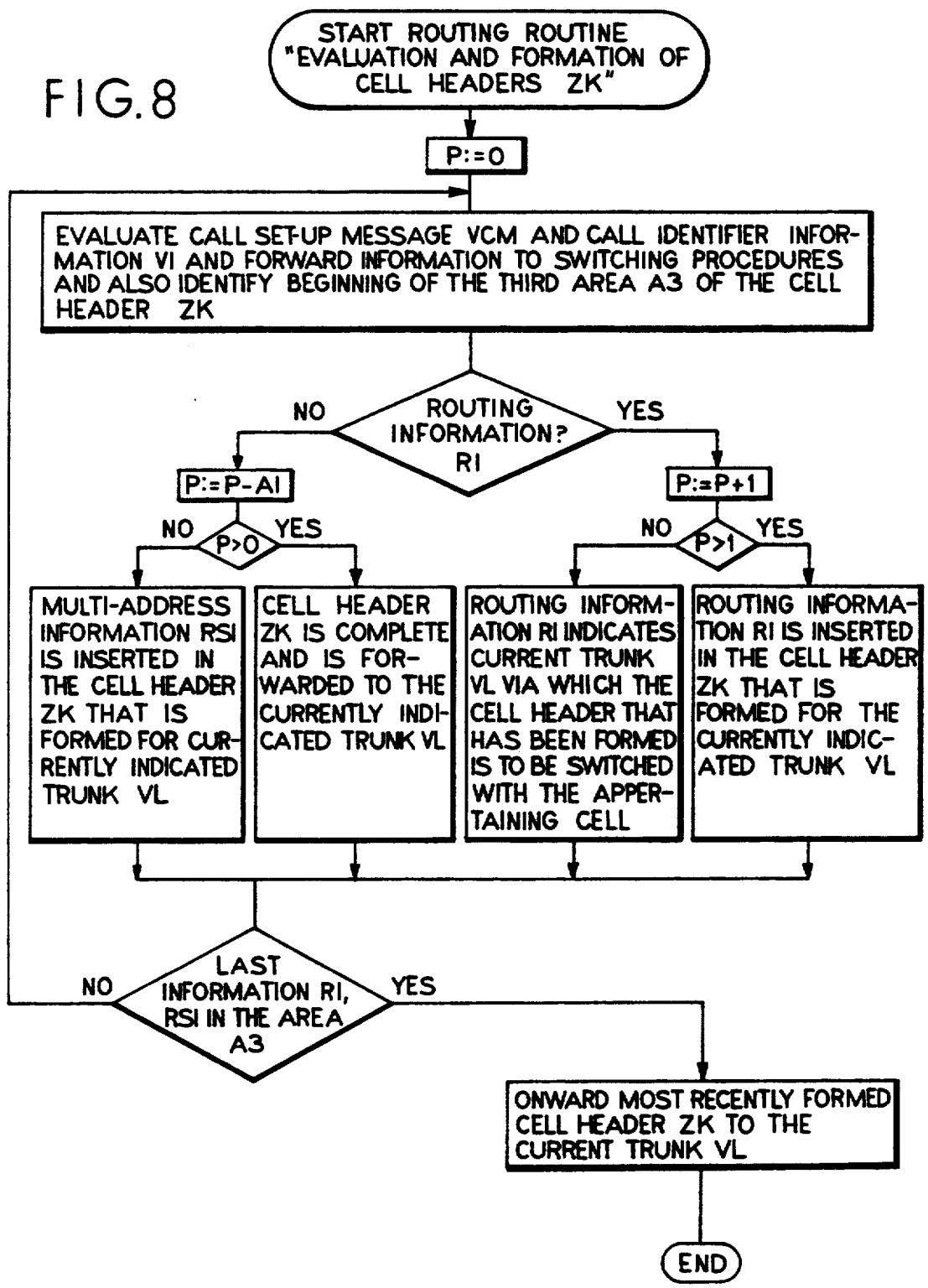

METHOD FOR MULTI-ADDRESS TRANSMISSION OF CELLS IN A COMMUNICATION NETWORK OPERATING IN THE ASYNCHRONOUS TRANSFER MODE

BACKGROUND OF THE INVENTION

Communication systems and switching structures or switching networks operating according to an asynchronous transfer mode are provided for future communication systems, particularly broadband networks. In this asynchronous mode packets having a fixed length, referred to as cells in the technical field, are transmitted in an uninterrupted fashion on every transmission section. These cells are composed of 48 octets for the useful information and of 5 octets for the cell header. When there is no useful information to be transmitted, specifically marked idle signals are transmitted.

A communication system or switching network operating according to the asynchronous transfer mode is structured into one or more network or switching stages, similar to a communication network or to the switching network of traditional digital communication networks or communication systems. The individual communication systems or switching stages are meshed with one another such that a largely blocking-free communication system or a switching structure results. The input and output lines of such a communication system or switching structure are identified from the switching-oriented information recited in the cell header of the cell, i.e. from virtual path information and virtual channel information. This switching-oriented information is derived from the multi-addressing information and destination information signalized by the subscribers of a communication system, i.e. telephone numbers of the destination subscribers.

It is known from the publication "ATM-Technologie ruer zukuenftige Breit-bandnetze" of Siemens AG, page 17, right-hand column to additionally identify routing information for the switching of a cell through a switching structure from the switching information recited in the cell header of the cell and to attach this to the cell. Using this routing information, the respective cell seeks the defined path through an n-stage switching structure under self-control, i.e. without the cooperation of a central communication system controller. The additional routing information is inserted into an internal cell header of the communication system and is placed in front of the respective cell. After the self-switching of the cell through the switching structure, the internal cell header of the communication system is removed.

The data scope of the switching-oriented information of the cell header or of the internal cell header of the communication system is essentially defined by the plurality of communication systems or of switching stages. One information string, for example, one byte, is usually provided for a communication system or a switching stage, these being compiled to form a block. Cell headers or internal cell headers of the communication system are being defined to an increasing degree that have a prescribed plurality of information strings matched to the maximum plurality of communication systems or switching stages, for example 5 bit octets or bytes for 5 communication systems or switching stages.

In the case of multi-address transmission of cells to a plurality of output lines of the communication network or of the switching structure, the self-control principle of the cells can no longer be maintained without further measures given cell headers or internal cell headers of the communication system that are structured in this way.

Consequently, routing information additionally calculated by a central communication system controller are stored in table form in the memories allocated to the communication systems or switching stages. The respective cell is communicated again via one or more branching paths to the prescribed output lines using this additionally calculated routing information.

SUMMARY OF THE INVENTION

It is an object of the present invention to provide switching cells to be multi-addressed via n-communication systems or via an n-stage switching structure while retaining the self-control principle.

In general terms the present invention is a method for multi-addressed transmission of cells in a communication network operating in the asynchronous transfer mode and formed by communication systems. A cell header provided with routing information is provided in every cell for the purpose of a cell self-control through the communication network. The routing information controls the respective cell over a single path through the communication network. Multi-addressing information specifically associated to the communication system that effects a renewed transmission of the multi-addressed cells in the recited communication systems and further routing information are formed for each additional path in each of the n communication systems of the communication network for the purpose of the self-control of multi-addressed cells through the communication network. The routing information allocated to a multi-addressing information respectively indicates a path of the retransmittable cell through the respectively remaining communication systems of the communication network to a prescribed multi-addressing destination subscriber.

The multi-addressing information and routing information communicated together with the cell are interpreted in every communication system. The cells as well as the multi-addressing information recited in the cell header, including the routing information, are communicated via the connecting lines or trunk lines identified by the routing information to the respectively following communication system or to the multi-addressing destination subscriber. The multi-addressing information pertaining to the respective communication system or routing information is then removed.

An important aspect of the method of the present invention is that routing information and multi-addressing information are additionally inserted into the cell header or the internal cell header of the communication system. The renewed transmission of cells in the respective communication systems or the switching stages is effected using this additional routing information and multi-addressing information on the one hand and, on the other hand, that connecting line to the next communication system or to the next switching stage is defined, i.e. the path to which the cell transmitted anew is to be switched. The essential criteria of the recited algorithm for forming routing information and multi-addressing information as well as the evaluation and processing of the information in the communication systems or switching stages are that a path branching in the respective communication system or the respective switching stage is indicated by a multi-addressing information and a repeated transmission of the respective cell is effected. The routing and multi-addressing information appertaining respectively to a communication system or a switching stage, i.e. the routing and multi-addressing information defining the connecting line to the next communication system or to the next switching stage, is removed in every communication system or every switching stage. The remaining multi-addressing information and routing information are inserted into the cell header or internal cell header of the communication system and are communicated via the defined connecting line to the following communication system or to the following switching stage. One advantage of the method of the present invention is that the memory areas for the path branchings can be eliminated for multi-addressed cells in the communication systems or switching stages.

The routing information is especially advantageously respectively represented by at least one destination information identifying the multi-address destination subscribers to the destination communication system and communication system identification information indicating the respective path through the communication network. A different communication system identification information is allocated to each communication system of the communication network. The destination information usually represents the internal or official telephone number of the destination subscriber or parts of this telephone number. The communication system identification information, for example, represents numerical information by means of which a communication system can be unambiguously identified in the communication network. A different numerical information is thereby allocated to each communication network, for example communication systems 1 through 20. The routing information is additionally formed by a respectively further sub-address information and/or subscriber information and/or subscriber indicator information and/or signalling reference point information attached to the destination information. Such additional routing information is particularly provided for the information exchange between the subscribers and for a retransmission of cells to the originating subscriber.

The multi-addressing information is advantageously formed by multi-addressing block information indicating the end of the respective path and by branching information indicating path branchings in the communication systems. The branching information is advantageously represented by a numerical information that, proceeding from the most recently recited communication system identification information, indicates the plurality of communication systems traversed on the path defined by the preceding multi-addressing information block in which a path branching occurs. This means that the branching information indicates the plurality of communication systems which, proceeding from the last-cited communication system identification information of the respective multi-addressing information block, is to be counted back in order to define that communication system in which a path branching occurs. The end of a path that is formed at least by a destination information and, potentially, communication system identification information is advantageously terminated by an end of multi-addressing block information. This end of multi-addressing block information, on the one hand, defines the end of the respective path and, on the other hand, indicates that there is a further path branching, whereby the communication system wherein a path branching occurs is identified by the branching information.

The routing and multi-addressing information provided for a multi-addressing connect is to be advantageously communicated by call set-up reports from an originating subscriber to a multi-address destination subscriber. Respective, virtual connections from the originating subscriber to the multi-address destination subscribers are set up using such call set up messages usually employed in networks operating in the packet and in the asynchronous transfer mode.

Every cell header is verified using a routing routine with respect to the presence of multi-addressing information and routing information in each of the communication systems. Given the presence of first routing information in the cell header or following multi-address information, the connecting line leading to the next communication system or the subscriber line leading to a destination subscriber are identified by such routing information using this routing routine. When further routing information is present, this is inserted into a cell header that is communicated to the communication system defined by the first routing information. When a multi-address information is present, then the end of the preceding, compiled routing information block is indicated and, dependent on the informational content of the branching information contained in the multi-addressing information, this is inserted into or removed from the cell header.

In the inventive method for switching structures, the multi-addressing information is also formed by multi-addressing block information indicating the end of the preceding routing information block and by switching stage information that indicates a path branching in one of the switching stages. The respective switching stage is informed on the basis of the respective end of multi-addressing block information that the previously compiled routing information block is complete and is to be inserted into an internal cell header of the communication system for the purpose of communication to the defined connecting line. The switching stage information is advantageously represented by numerical information that indicates the plurality of connecting lines that were traversed on the path identified by the preceding multi-addressing information block. The traversed connecting line is thus identified using the numerical information and the switching stage from which cells are communicated via the identified connecting line is declared to be the switching stage wherein a path branching occurs. What is thereby achieved is that, proceeding from a connecting line and the path which is respectively identified by the last routing information of the preceding multi-addressing information block, the plurality of traversed connecting lines is indicated by the numerical information and is identified by the switching stage in which a path branching occurs, i.e. the respective cell is re-transmitted.

According to an advantageous development of the method of the present invention, length information representing the data scope of an internal cell header of the communication system is inserted into every internal cell header of the communication system. The recognition and interpretation of the internal cell header of the communication system are facilitated by the indication of length information. A further advantage of the method of the present invention is that the data scope of the internal cell header of the communication system is considerably reduced for cells that are not to be multi-addressed, being reduced by indicating length information, particularly in a switching structure having a few switching stages. This means an increase in the cell throughput rate through the switching structure. Given multi-addressed cells, the data scope of the internal cell header of the communication system may potentially be greater than cell headers prescribed by the data scope. By avoiding additional memory areas in the respective switching stages for the additional routing information, however, this is more then compensated in view of the cell throughput rate. Over and above this, the self-control principle for cells through a switching structure is preserved without restrictions, even for the switching of cells to be multi-addressed.

In another advantageous development of the method of the present invention, the cell header is octet-structured or byte-structured and the multi-addressing information or the routing information are represented by binarily coded bit octets or bytes. The length information is thereby defined by the plurality of bit octets or bytes having the cell header. An octet or byte structuring seems especially advantageous since an octet-by-octet or byte-by-byte processing of both the internal cell header of the communication system as well as of the cell header which is likewise structured octet-by-octet or byte-by-byte is thereby possible and, consequently, realizations that are equivalent in terms of circuit technology can be implemented.

An advantageous realization of the method of the present invention is achieved by a routing routine that is to be provided in every switching stage of the switching structure. The cell header is thereby verified octet-sequentially or byte-sequentially for the presence of multi-addressing or routing information. Both simple cells as well as multi-addressed cells can be advantageously communicated using this simple routing routine realized in program-oriented terms without limitation with respect to the self-control principle through the switching structure.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a switching procedure of multi-addressed cells in a three-stage ATM switching structure;

FIG. 2 depicts the internal cell header of the communication system at an input line of FIG. 1;

FIG. 3 depicts the internal cell header of the communication system according to the coupling stage defined in FIG. 1;

FIGS. 4A, 4B depict respective multi-addressing or routing information;

FIG. 5 is a flowchart of a routing routine;

FIG. 6 depicts a switching procedure of multi-addressed cells in a communication network;

FIG. 7 depicts a cell header of the switching stage N1 defined in FIG. 6; and

FIG. 8 is another flowchart of a routing routine for a communication network of FIG. 6.

DESCRIPTION OF THE PREFERRED EMBODIMENT

FIG. 1 shows a switching network structure SN operating according to the asynchronous transfer mode (referred to below as ATM) which has three switching stages KS1 . . . KS3. Since the third switching stage KS3 is fashioned as a reversing stage, a five-stage switching structure SN derives for the exemplary embodiment, whereby the fourth stage is represented by the second stage. The fifth switching stage KS1 . . . KS5 is also represented by the first stage. Consequently, the lines brought in from the appertaining communication system can be both input lines EL via which cells formed in the asynchronous transfer mode are conducted to the switching structure SN as well as output lines AL via which the switched cells are conducted to the communication system. The input and output lines EL, AL are identified dependent on the subscriber-signalled multi-address information and destination information, i.e. are derived from virtual path and channel information recited in the cell header. For the exemplary embodiment, for example, the input line EL shown in FIG. 1 has been identified. Connecting lines VL are arranged between the switching stages KS1 . . . KS5 for the purpose of a meshing of the switching stages KS1 . . . KS5, whereby only the connecting lines VL via which cells are communicated in conformity with the exemplary embodiment are shown in FIG. 1.

Let it also be assumed for the exemplary embodiment that the cells introduced via the input line EL are to be multi-addressed to serving lines AL1 . . . AL6 shown in FIG. 1 and are to be switched by the switching structure SN. The cells are to be respectively switched via the required plurality of switching stages KS1 . . . KS5 dependent on the output line AL1 . . . AL6 to be selected.

An internal cell header IZK1 of the communication system which is shown in FIG. 2 is attached before every cell to be switched during this switching and is communicated to the first switching stage KS1 via the input line EL. Routing information ri for each of the connecting lines VL shown in FIG. 1 as well as a multi-addressing information rsi for every path branching are contained in this internal cell header IZK1 of the communication system (see FIG. 4). Every routing information ri is thereby represented by a x-value provided with numerical information, whereby this x-value respectively indicates the address of the connecting line VL departing the respective switching stage KS to the next switching stage KS. The first three routing information $x_1$, $x_{11}$, $x_{111}$ indicate the path across the switching structure SN via which the respective cell is to be switched to the first serving line AL1. Multi-addressing information rsi is subsequently inserted, this being formed by a multi-addressing end of block information bei and by a numerical switching stage information ki (the numeral 3 in FIG. 2). The multi-addressing end of block information bei indicates that the previously recited multi-addressing information $x_1$, $x_{11}$, $x_{111}$ completely define a path through the switching structure SN. Thereafter, the routing information $x_1$ referring to the first switching stage KS1 is removed and the remaining routing information $x_{11}$, $x_{111}$ are introduced into an internal cell header IZK of the communication system that is formed in the first switching stage KS1 and are communicated together with the cell via the connecting line VL identified by the routing information $x_1$. What is expressed by the switching stage information ki represented by the numeral 3 is that, proceeding from the connecting line VL allocated to the most recently recited routing information $x_{111}$, a path branching occurs in the switching stage KS1 lying three connecting lines VL farther back which communicates cells onto the traversed connecting line VL, whereby the output and input lines EL, AL are also evaluated as connecting line VL. This means that a path branching occurs in the first switching stage KS1. The following routing information $x_2$, $x_{21}$, $x_{211}$, $x_{2111}$, and $x_{21111}$ indicate the path up to the serving line AL2 for the cell that is to be retransmitted. The subsequently inserted multi-addressing end of block information bei indicates that the branching path is completely defined and the following, switching stage information ki indicate that a further path branches in the fifth switching stage KS5. The following routing information $x_{21111}$ defines the branching connecting line that is represented in the exemplary embodiment by the third serving line AL3. The following multi-addressing information rsi again indicates the definition of a complete path and the switching stage information ki contained therein determine that a further path branching occurs in the first switching stage KS1. The attached routing information $x_3$, $x_{31}$, $x_{311}$, $x_{3111}$, $x_{31111}$ define the switching path of the cell through the five switching stages KS1 ... KS5 to the fourth output line AL4. The following multi-addressing information rsi again indicates that a branching path is completely defined and the switching stage information ki defines that a further path branching is present in the fourth switching stage KS4. The following routing information $x_{3112}$, $x_{31121}$ indicate the branching switching path of the cell to the fifth output line AL5. This latter multi-addressing information rsi defines an additionally branching path in the fifth switching stage KS5. The appertaining routing information $x_{31122}$ indicates the branching connecting line VL which is defined in the exemplary embodiment by the sixth output line AL6. A byte containing the length information li is attached preceding the routing and multi-addressing information ri, rsi. The length information li indicates the plurality of bytes of the internal cell header IZK1 of the communication system (26 bytes in the exemplary embodiment). Further, the internal cell header IZK1 of the communication system is generally formed by a preset synchronous byte SB as well as by two following transmission bytes UEB that are provided for the synchronization of the received bytes as well as for the transmission of transmission-associated information.

This internal cell header IZK1 of the communication system received in the first switching stage KS1 is interpreted in the first switching stage KS1 and the multi-addressing and routing information rsi, ri respectively associated to the switching stage are removed. With respect to the exemplary embodiment, these are the routing information $x_1$, $x_2$ and $x_3$. The remaining multi-addressing information and routing information rsi, ri are inserted into further internal cell headers IZK of the communication system formed in this switching stage KS1 and are forwarded to the connecting lines defined by the routing information $x_1$, $x_2$ and $x_3$. The internal cell header IZK2 of the communication system shown in FIG. 3 is shown as an example of the internal cell headers IZK of the communication system formed in each coupling stage KS1 ... KS5. This cell header IZK2 is switched from the third switching sage KS3 to the fourth switching stage KS4 via the connecting line VL determined by the routing information $x_{311}$.

The formation of the internal cell headers IZK of the communication system in the individual switching stages KS1 ... KS5 as well as the interpretation of the incoming internal cell headers IZK of the communication system is effected by a routing routine implemented in every switching stage KS1 ... KS5. A possible program-oriented realization of a routing routine is indicated by a self-explanatory flowchart in FIG. 5.

FIGS. 4A and 4B show routing information ri having a bit octet or one byte and multi-addressing information rsi. The identification of the bytes as routing information ri or as multi-addressing information rsi ensues, for example, with the last bit B, whereby this last bit B simultaneously represents the multi-addressing end of block information bei given a multi-addressing information rsi. For example, logical "0" information of the last bit B thereby defines a routing information ri and logical "1" information defines a multi-addressing information rsi. The actual routing information in the preceding bits of the routing information ri is represented by a x-value x ... indicated according to FIGS. 1 through 3. The connecting line VL leading to the next switching stage KS is respectively defined by this x-value x ..., i.e. the address of this connecting line VL is indicated. 64 connecting lines VL can be identified or addressed using the first 6 bits, and 128 connecting lines can be identified or addressed using the first 7 bits. The switching stage information xi, which is advantageously represented by numerical information, is recited in the multi-addressing information rsi of FIG. 4B by the first bits (for example, 4 bits). Both the x-values x ... as well as the switching stage information xi are advantageously recited binarily coded given octet-structured or byte-structured internal cell headers IZK of the communication system.

FIG. 6 shows a communication network KM operating in conformity with ATM that is formed by a plurality of communication systems KA. Each of the communication systems KA (realized, for example, by digital switching systems) has an identification number N1 ... N1321 allocated to it. A multi-addressing originating subscriber A is connected to the communication system having the identification N1. The continuous numbering of the identifications N1 ... N1321 is adapted to this exemplary embodiment. In practice, this numbering will be adapted to the network hierarchy of the respective communication network.

Let it also be assumed for the exemplary embodiment that the multi-addressing originating subscriber A wishes to multi-address a message to 8 destination subscribers B1 ... BS. The first multi-addressing destination subscriber B1 is connected to the communication system KA having the identification N1. The second multi-addressing destination subscriber B2 is connected to a communication system KA having the identification N111, this communication system having the identification N111 being brought to the communication system KA having the identification N1 via a communication system KA having the identification N11. This communication system KA having the identification N1 is additionally conducted via the communication systems KA having the identifications N12, N121 to two further communication systems KA having the identifications N1211, N12112. The third multi-addressing destination subscriber B3 is connected to the communication system KA having the identification N1211 and the fourth and the fifth multi-addressing destination subscribers B4, B5 are connected to the communication system KA having the identification N1212. The communication system KA having the identification N1, further, is connected to a communication system KA having the identification N13 that has a connection to the multi-addressing destination subscriber B5. The communication systems KA having the identifications N131 and N132 are brought to the communication system KA having the identification N13, whereby the sixth multi-addressing destination subscriber B6 is connected to the communication system KA having the identification N131. The seventh multi-addressing destination subscriber B7 is allocated to a communication system KA having the identification N1321 that is connected to the communication system KA having the identification N132. The connections between the communication systems KA are realized by the known connecting lines VL. Only those communication systems KA and multi-addressing subscribers A, B1 . . . B8 that are involved in the multi-addressing connection of the example are shown in FIG. 6.

FIG. 7 shows a cell header that is formed either by the multi-addressing originating subscriber A or in the communication system KA having the identification N1 and that represents the basis for the switching of multi-addressed cells from the multi-addressing originating subscriber A to the eighth multi-addressing destination subscribers B1 . . . B8. For example, a call set up message vam is contained in the first area A1 of the cell header ZK (for example, a bit octet). The packet to be communicated is identified as a call set up packet by this call set up message. A virtual multi-addressing connection provided for the further communication is established from the multi-addressing originating subscriber A to all multi-addressing destination subscribers B1 . . . B8 using this call set up packet.

A call identification information vi is inserted in the second area A2 of the cell header ZK. Whether the call to be set up is a matter of a call between a subscriber A and a subscriber B or a matter of a branching path, i.e. branching connection of a multi-addressing connection, is indicated this call identification information vi.

Routing information ri and multi-addressing information rsi required for the multi-addressing connection are entered in the third area A3. The routing information ri and multi-addressing information rsi are formed according to FIG. 2. However, communication system identification information n1 . . . n1321 as well as destination information b1 . . . . b8 identifying the multi-addressing destination subscribers B1 . . . B8 are inserted instead of the respective X-value indicating the address of the respective switching stage KS. As in FIG. 2, the multi-addressing information rsi is formed by a multi-addressing end of block information bei and by a branching information al that is different from FIG. 2 but has the same effect. The branching information ai represents numerical information that, proceeding from the most recently cited communication system identification information n . . . of the respective path, indicates in what traversed communication system KA of this path a path branching occurs, i.e. the communication system KA having the respective communication system identification information n . . . . The second line of the third area A2 of the cell header ZK shall be explained as a example. The first two communication system identification information N11, N111 indicate that the multi-addressed cells are to be switched via the communication systems KA having the identifications N11 and N111. The following destination information b2 indicates that the multi-addressed cells to be communicated to the multi-addressing subscriber B2 connected to the communication system KA having the identification N111. The following multi-addressing end of block information bei indicates the end of the path to the second multi-addressing destination subscriber B2. The following numerical information 2 represents the branching information ai and indicates that, proceeding from the most recently cited communication system KA having the identification N111, a further path branching occurs in the second traversed communication system, i.e. in the communication system KA having the identification N1. Analogously to the second line that has been set forth and to the method of the present invention according to FIG. 2, the further routing or multi-addressing information ri, rsi of the cell header ZK are formed for every further path or branching path of the multi-addressing connection.

Analogous to the illustration in FIG. 3, the cells are communicated to the following communication systems KA in accord with the indicated routing and multi-addressing information ri, rsi, being communicated in the communication systems KA by interpreting or evaluating the incoming cell headers ZK. The routing or multi-addressing information ri, rsi pertaining to the respective communication system KA is thereby removed, i.e. information for the respective path is inserted into a newly formed cell header ZK and are communicated to the further communication system KA together with the cell. The formation of these further cell headers ZK ensues analogous to the formation of an internal cell header IKZ2 of the communication system that is set forth in FIG. 3.

The interpretation and formation of the further cell headers ZK in the communication systems KA is achieved by an identically acting routing routine of FIG. 5. A possible program-oriented realization for ATM communication networks is shown in a self-explanatory flowchart of FIG. 8.

The method of the present invention can be employed in ATM communication networks designed according to existing standards, whereby further information defined in the standard can then be inserted into the cell headers. This, for example, is indicated by the bracketed information ib following the destination information B7. These, for example, are sub-addresses of the multi-addressing destination subscribers B1 . . . B8 and, in particular, information that do not relate to the network but to the subscriber equipment, for example display information. Further, these are also information that indicate the signalling point of reference of the subscriber. This information is of significance for a return transmission of cells from the multi-addressing destination subscribers B1 . . . B8 to the multi-addressing originating subscriber A.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for multi-addressed transmission of cells in a communication network operating in asynchronous transfer mode and formed by communication systems, comprising the steps of:

provising a cell header having routing information in every cell for cell self-control through the communication network, the routing information controlling a respective cell over a single path through the communication network;

forming multi-addressing information and further routing information, that is specifically associated to a respective communication system for each additional multi-addressed path in each of the communication systems of the communication network for self-control of multi-addressed cells through the communication network, the multi-addressing information effecting a transmission of the multi-addressed cells in each branching point of said respective communication system, the routing information allocated to multi-addressing information respectively indicating a path of a retransmittable cell through respectively remaining communication systems of the communication network to a prescribed multi-addressing destination subscriber;

interpreting the multi-addressing information and the routing information, that are communicated together with the cell, in every communication system and switching said multi-addressing cells and the multi-addressing information recited in said cell header of said cells including the routing information via connecting lines or trunk lines identified by the routing information to a respectively following communication system or to said prescribed multi-addressing destination subscriber; and removing the multi-addressing information, including the routing information, pertaining to the respective communication system.

2. The method according to claim 1, wherein the routing information has at least one destination information identifying the multi-addressing destination subscriber at a destination communication system and has communication system identification information indicating a respective path through the communication network, whereby different communication system identification information is allocated to every communication system of the communication network.

3. The method according to claim 2, wherein the routing information has at least one of sub-address information, subscriber information, subscriber indication information and signalling reference point information respectively attached to the destination information.

4. The method according to claim 1, wherein the multi-addressing information is formed by multi-addressing end of block information indicating an end of a respective path and by branching information indicating a path branching in one of the communication systems.

5. The method according to claim 4, wherein the branching information is numerical information which, proceeding from a most recently received communication system identification information, indicates a plurality of communication systems wherein a path branching occurs which has been traversed by a path defined by a preceding multi-addressing information block.

6. The method according to claim 1, wherein the routing information and the multi-addressing information are communicated in call set up messages from an originating subscriber to destination subscribers, whereby virtual connections from the originating subscriber to the destination subscribers are set up by the multi-addressing information and the routing information.

7. The method according to claim 4, wherein the method further comprises:

verifying every cell header for the presence of multi-addressing information or routing information in every communication system using a respectively allocated routing routine;

such that, given the presence of first routing information in the cell header or following multi-addressing information, a connecting line leading to a next communication system or a subscriber line leading to a destination subscriber is determined by this routing information;

such that, given the presence of further routing information, said further routing information is inserted into a cell header formed in a respective communication system for a switching via a most recently identified connecting line, whereby the first routing information is not inserted into the cell header; and such that, given the presence of multi-addressing information, an end of a previously compiled routing information block is indicated for a switching via the most recently identified connecting line; and dependent on the informational content of the branching information, the multi-addressing information is removed from or inserted into the cell header.

8. A method for multi-addressed transmission of cells in a switching structure of a communication system operating in asynchronous transfer mode, the switching structure having input and output lines and formed of switching stages interconnected by connecting lines, comprising the steps of:

identifying the input and output lines of the switching structure that is formed of the switching stages and interconnected by the connecting lines, by subscriber-signalled multi-addressing origination and destination information;

attaching an internal cell header of the communication system and having routing information preceding every cell for cell self-control through the switching structure, routing information that controls a respective cell across a single path through said switching stages, that is formed by a switching structure controller and that is inserted into the internal cell header of the communication system being provided for every cell;

forming multi-addressing information, that is specifically associated to a switching stage that effects a transmission of the multi-addressed cells in the respective switching stages, for every additional path in each of the switching stages of the switching structure for self-control of multi-addressed cells through the switching structure, and forming further routing information, the routing information attached to multi-addressing information respectively indicating a path of a retransmittable cell across respectively remaining switching stages of the switching structure to a prescribed output line;

compiling the multi-addressing information including appertaining routing information, calculated for every path branching in the switching stage wherein a first path branching occurs, for said switching stage dependent on a sequence of following switching stages and path branchings in these following switching stages and inserting the multi-addressing information and appertaining routing information into the internal cell header of the communication system; and interpreting the multi-addressing information and routing information that are communicated together with the cell in every switching stage, and communicating said multi-addressed cells and the multi-addressing information, including the routing information, to a following switching stage on the basis of a further internal cell header of the communication system that is formed in the respective switching stage, being communicated to the following switching stage via connecting lines defined by the multi-addressing information and routing information; and removing the multi-addressing information including the routing information pertaining to the respective switching stages from said internal call headers.

9. The method according to claim 8, wherein the multi-addressing information is formed by a multi-addressing end of block information indicating an end of a preceding routing information block and by switching stage information that indicates a path branching in one of the n switching stages.

10. The method according to claim 9, wherein the switching stage information is numerical information which indicates a plurality of connecting lines traversed on a path defined by a preceding multi-addressing information block; and wherein a traversed connecting line is identified using the numerical information, and the switching stage from which cells are communicated via the identified connecting line is thereby defined as a switching stage in which a path branching occurs.

11. The method according to claim 8, wherein length information representing data scope is calculated for every internal cell header of the communication system and is inserted into the internal cell header of the communication system.

12. The method according to claim 8, wherein multi-addressing information or routing information in an internal cell header of the communication system that is byte-structured or octet-structured, respectively, is represented by a binarily coded bit octet or byte, respectively; and wherein length information is defined by a plurality of bit octets or bytes having the internal cell header of the communication system.

13. The method according to claim 12, wherein the method further comprises:

verifying every internal cell header of the communication system octet-sequentially or byte-sequentially for the presence of multi-addressing information or routing information, respectively, in every switching stage using a respectively allocated routing routine;

such that, given the presence of first routing information in the internal cell header of the communication system or following multi-addressing information, a connecting line leading to a next switching stage is defined by said routing information;

such that, given the presence of further routing information, said further routing information is inserted into an internal cell header of the communication system that is formed in the respective switching stage for a switching via a most recently identified connecting line; and such that, given the presence of multi-addressing information, an end of a previously compiled routing information block is indicated for a switching via the most recently identified connecting line; and the multi-addressing information is removed from or inserted in the internal cell header of the communication system dependent on the informational content of the switching stage information.

* * * * *